(12) United States Patent
Pitwon

(10) Patent No.: US 9,759,634 B2
(45) Date of Patent: Sep. 12, 2017

(54) COUPLING LOSS EVALUATION

(71) Applicant: Seagate Technology LLC, Cupertino, CA (US)

(72) Inventor: Richard C. A. Pitwon, Fareham (GB)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/853,755

(22) Filed: Sep. 14, 2015

(65) Prior Publication Data

US 2017/0074752 A1   Mar. 16, 2017

(51) Int. Cl.
*G01M 11/00* (2006.01)
*G02B 6/42* (2006.01)

(52) U.S. Cl.
CPC ............ *G01M 11/33* (2013.01); *G02B 6/429* (2013.01); *G02B 6/4214* (2013.01); *G02B 6/4291* (2013.01)

(58) Field of Classification Search
CPC .................................. G02B 6/02; G01M 11/33
See application file for complete search history.

(56) References Cited

U.S. PATENT DOCUMENTS

| 4,844,573 | A  | * | 7/1989  | Gillham ............... G02B 6/4246 |
|           |    |   |         | 156/158 |
| 6,925,238 | B2 | * | 8/2005  | Lee ........................ G01M 11/35 |
|           |    |   |         | 385/123 |
| 7,466,880 | B2 |   | 12/2008 | Windover |
| 7,539,376 | B2 |   | 5/2009  | Bozso et al. |
| 2003/0123793 | A1 |   | 7/2003 | Johannessen |
| 2003/0123804 | A1 |   | 7/2003 | Nikonov et al. |
| 2014/0043050 | A1 |   | 2/2014 | Stone et al. |
| 2014/0268120 | A1 | * | 9/2014 | Assefa ............... G01N 21/9501 |
|           |    |   |         | 356/237.5 |

OTHER PUBLICATIONS

Baghsiahi, et al., Aug. 15, 2013, "Optical Waveguide End Facet Roughness and Optical Coupling Loss", *IEEE Journal of Lightwave Technology*, 31(16):2659-2668.
Pitwon, et al. Feb. 15, 2015, "Pluggable Electro-Optical Circuit Board Interconnect Based on Embedded Graded-Index Planar Glass Waveguides," *IEEE/OSA Journal of Lightwave Technology*, 33(4):741-754.

* cited by examiner

*Primary Examiner* — Ryan Lepisto
(74) *Attorney, Agent, or Firm* — Mueting, Raasch & Gebhardt, P.A.

(57) ABSTRACT

The exemplary systems, apparatus, structures, and methods may include an assembly including substrate, an optical waveguide, and an optical access associated with the optical waveguide. Light from the optical access may be measured along the optical waveguide. The coupling loss of the optical waveguide may be determined based on at least the light measurements from the optical access.

20 Claims, 18 Drawing Sheets

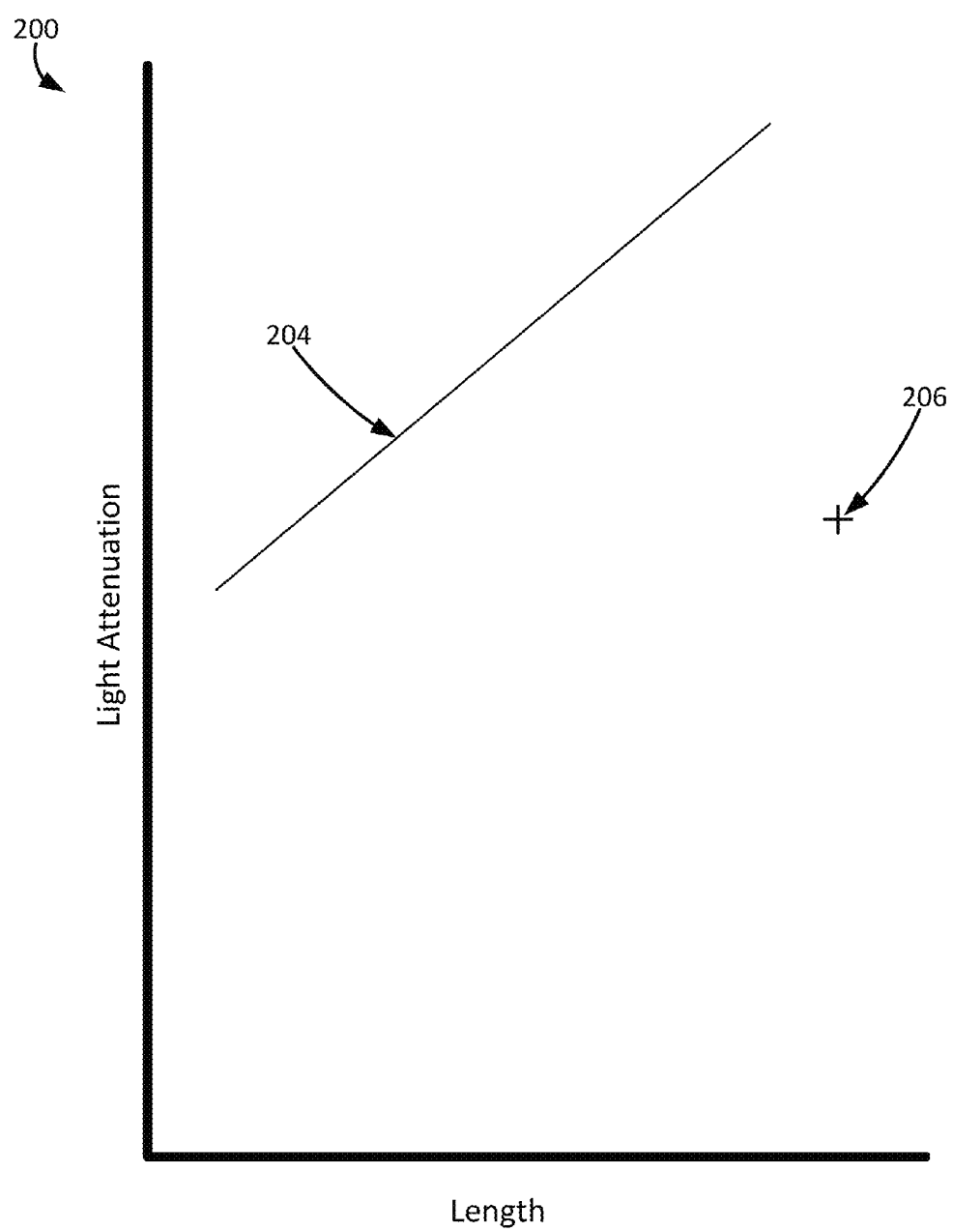

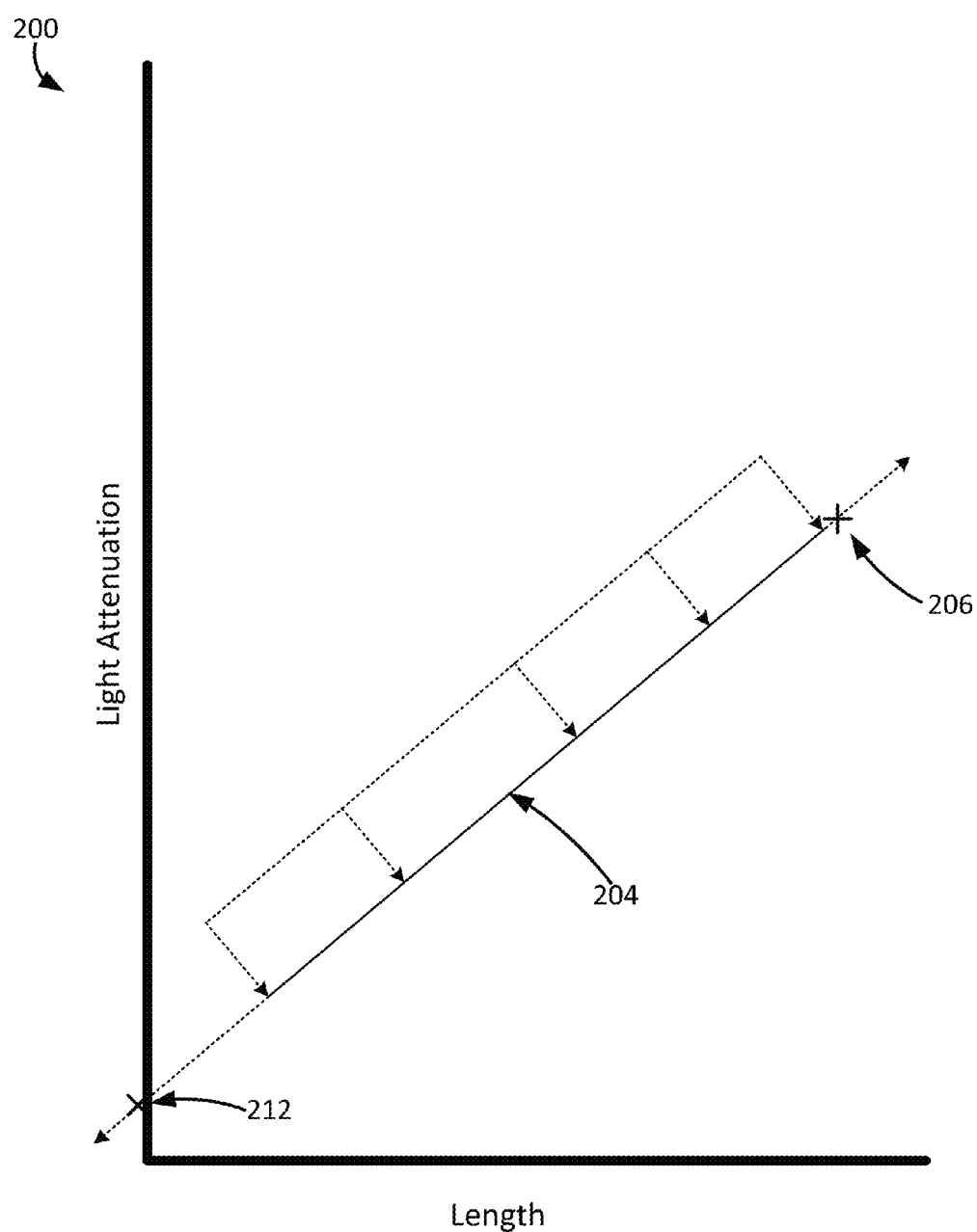

COUPLING LOSS EVALUATION

The disclosure herein relates to systems, structures, apparatus, and methods for evaluating the coupling loss of a waveguide.

SUMMARY

One exemplary method may include providing an assembly. The assembly may include a substrate defining a first surface and a second surface opposite the first surface, an optical waveguide located between the first and second surfaces and extending from a first end region to a second end region, and an optical access (e.g., optical trench, optical vias, etc.) positioned along at least a portion of the optical waveguide and extending through at least a portion of the substrate from the first surface towards the optical waveguide to transmit light (e.g., scattered light, evanescent light, etc.) from the optical waveguide. The exemplary method may further include directing light into the first end region of the optical waveguide, measuring light (e.g., scattered light, evanescent light, etc.) from the optical waveguide using the optical access along a plurality of different points along the optical waveguide, and determining coupling loss of the optical waveguide based on the measured light (e.g., scattered light, evanescent light, etc.).

One exemplary system may include a light measurement apparatus to measure light from an optical waveguide located within an assembly. The assembly may include a substrate defining a first surface and a second surface opposite the first surface, the optical waveguide located between the first surface and second surface and extending from a first end region to a second end region, and an optical access (e.g., optical trench, optical vias, etc.) positioned along at least a portion of the optical waveguide and extending through at least a portion of the substrate from the first surface towards the optical waveguide to transmit light (e.g., scattered light, evanescent light, etc.) from the optical waveguide. The exemplary system may further include a computing apparatus operably coupled to the light measurement apparatus and configured to measure light (e.g., scattered light, evanescent light, etc.) from the optical waveguide using the optical access along a plurality of different points along the optical waveguide, and to determine coupling loss of the optical waveguide based on the measured light (e.g., scattered light, evanescent light, etc.).

One exemplary assembly may include a substrate defining a first surface and a second surface opposite the first surface, a cladding layer embedded within the substrate between the first surface and second surface, a plurality of optical waveguides embedded within the cladding layer, and an optical access (e.g., optical trench, optical vias, etc.) associated with an optical waveguide. The optical access may be positioned along at least a portion of the associated optical waveguide and extend through at least a portion of the substrate from the first surface towards the associated optical waveguide to transmit light (e.g., scattered light, evanescent light, etc.) from the associated optical waveguide.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

FIGS. 9A-9D depict graphs of light attenuation versus length of an exemplary hypothetical optical waveguide used to determine coupling loss of the optical waveguide.

DETAILED DESCRIPTION

Figure 1:
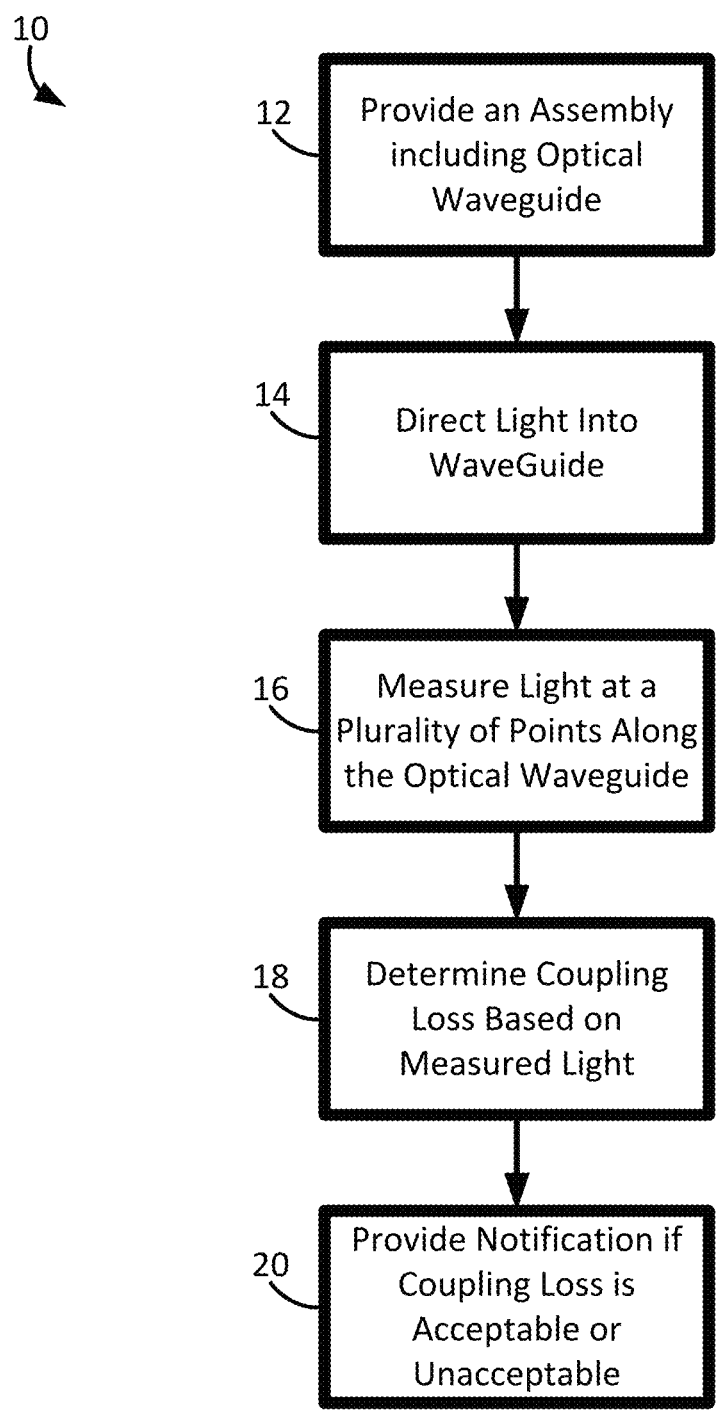
FIG. 1 is a block diagram of an exemplary method of evaluating coupling loss of an optical waveguide.

The disclosure herein includes exemplary systems, apparatus, structures, and methods for evaluating coupling loss of an optical waveguide in an assembly such as, e.g., a printed circuit board (PCB) assembly. Electronic devices such as, e.g., storage devices, computing devices, networking devices, etc. may use and/or include circuit boards (e.g., PCBs) including one or more optical waveguides.

Optical waveguide materials and fabrication techniques may provide low-cost methods of incorporating short-reach optical links into printed circuit boards to, e.g., allow the fabrication of electro-optical circuit boards. Such waveguide technology may be useful in overcoming bandwidth choke-points in data communication systems by increasing bandwidth density by potentially over two orders of magnitude. Optical propagation along waveguides may suffer from loss mechanisms including, e.g., bend transition loss, material absorption loss, crossover loss, and coupling losses at the input and output interface facets of the waveguide.

Coupling loss may be described to be caused by a combination of Fresnel losses at the refractive index boundaries at the input end facet and the output end facet and scattering due to the surface roughness of the end facets such as, e.g., refractive scattering and diffractive scattering. Refractive scattering may be described as being caused by light rays leaking from the waveguide when the waveguide forms angles with the randomly, or quasi-randomly, uneven portions of the input and output end facets, which are outside the critical angle required for total internal reflection. Diffractive scattering may be described as depending on another parameter of the roughness, namely auto-correlation length, which is a measure of the periodicity of the facet roughness, said periodicity causing the roughness profile to effectively act as a diffraction grating, and thus, having an additional strong impact on the amount of scattering. The insertion loss I of a waveguide is defined by $I=10 \log_{10} (P_{in}/P_{out})$ where $P_{in}$ is the optical power launched into the waveguide input port typically by means of a launch fibre and $P_{out}$ is the amount of light measured exiting the output port of the waveguide. Optical interface coupling loss of the input and output facets of an embedded optical waveguide, or channel, may represent one of the largest loss mechanisms in embedded optical waveguides.

Evaluation of coupling loss in embedded optical waveguides may use a destructive technique known as the "cut-back" method, which in practice gives rise to very few measurement points (such as, e.g., three measurement points) against which to extrapolate the coupling loss. Further, the "cut-back" method may be fraught with inaccuracies including assumptions regarding, that for each measurement, the waveguide end facets are of the same quality.

In the "cut-back" method, a sample assembly including a waveguide of a given length is taken and its insertion loss is measured. Then, the sample assembly is cut to a shorter length, the input and output facets prepared in the same way, and the insertion loss on the sample assembly is re-measured. Next, the different insertion losses are graphed according to the waveguide length, and a best fit line is plotted to match the expected linear decrease in insertion loss (dB) by decrease in length, and the coupling loss at both end facets is extrapolated from the graph. The coupling loss will be the determined by an intersect between the best fit line and the y-axis (waveguide length=0). In practice, the "cut-back" measurements may be described as being cumbersome. Further, as described herein, typically no more than three measurements are taken, which results in only three values on which to base the extrapolation. Still further, the validity of the data extrapolation assumes the coupling loss at the input and output waveguide facets is the same each time the sample is cut, which may be highly unlikely to be the case, especially when dealing with multimode waveguides.

The exemplary methods, apparatus, structures, and systems provide a low-cost, non-destructive coupling loss evaluation and determination. Further, the exemplary methods, apparatus, structures, and systems may yield many more measurement points on evaluation, or test, waveguides in-situ on the functional board, which may provide more accurate measurement of the coupling loss. In other words, the exemplary methods, apparatus, structures, and systems may be described as providing a low-cost evaluation, or test, that may allow much more accurate extrapolation of coupling loss, which may enable in-situ quality assurance for embedded waveguides at the fabricator level or at the system integrator level. The exemplary methods, apparatus, structures, and systems may be described as being more accurate than the "cut-back" methods because the exemplary methods, apparatus, structures, and systems may allow a large number of data points to be gathered, giving rise to a more accurate best fit plot, and may allow non-straight structures to be measured, such as bends (which, e.g., may be difficult to measure coupling loss using the "cut-back" method).

An exemplary method 10 for evaluating an optical waveguide of a circuit board is depicted in FIG. 1. As shown, the method 10 includes providing an assembly including an optical waveguide (block 12). An exemplary assembly 100 as depicted in FIGS. 2-8 may include a substrate 102 such as, e.g., an electro-optical printed circuit board (PCB) or an optical PCB without any electrical apparatus (e.g., electrical traces, integrated circuits, etc.). As shown in FIGS. 2-8, the exemplary substrate 102 is an electro-optical PCB and includes a plurality of electrical and/or mechanical components 104 (e.g., integrated circuits, micromechanical machines, etc.) coupled thereto.

The substrate 102 may define a first, or upper, surface 106 and a second, or lower, surface 108 opposite the first surface 106 (e.g., the first surface 106 faces the opposite direction that the second surface 108 faces, the second surface 108 faces the opposite direction that the first surface 106 faces, etc.) and include a plurality of layers including one or more different materials to facilitate the electrical and optical functionality of the assembly 100 located between the first surface 106 and the second surface 108. The present disclosure is directed towards the optical functionality of the assembly 100, and thus, the structures and apparatus related to the electrical functionality will not be described in further detail herein. It is to be understood that the assembly 100 and substrate 102 may include any electrical circuit board functionality and connectivity to the depicted electrical and/or mechanical components 104 (e.g., microchips, etc.).

As shown in the cross-sections of the assembly 100 in FIGS. 3-8, the substrate 102 may include an upper layer 110 and a lower layer 112, each of which may include more than a single layer or portion. The substrate 102 further includes a waveguide layer 120 between the upper layer 110 and the lower layer 112. Although a single waveguide layer 120 is depicted in the exemplary embodiment, it is to be understood that more than one waveguide layer 120 may be located in, or embedded within, the substrate 102.

The waveguide layer 120 may include cladding material 122 and a plurality of optical waveguides 130. The cladding material 122 may be described as surrounding, or encasing, each of the plurality of optical waveguides 130 and including a lower refractive index than the material of the optical waveguides 130, e.g., to limit light being transmitted outside of the optical waveguide 130 through total internal reflection (TIR) at the boundary between the waveguides 130 and the cladding material 122. Although the cladding material 122 in FIGS. 3-8 appears homogenous and being part of a single layer, it is be understood that the cladding material 122 may include more than one portion such as, e.g., different portions of cladding material surrounding, or encasing, each of the optical waveguides 130, additional material located between each of the optical waveguides 130, one or more layers of cladding material, etc.

The cladding material 122, which has a lower refractive index than the material of the optical waveguides 130, may include one or more polymers such as, e.g., polyacrylate, polysiloxane, polynorbonene, etc. and/or one or more glasses such as, e.g., chalcogenide glasses, toughed alkali-aluminosilicate sheet glass, etc.

Figure 2:
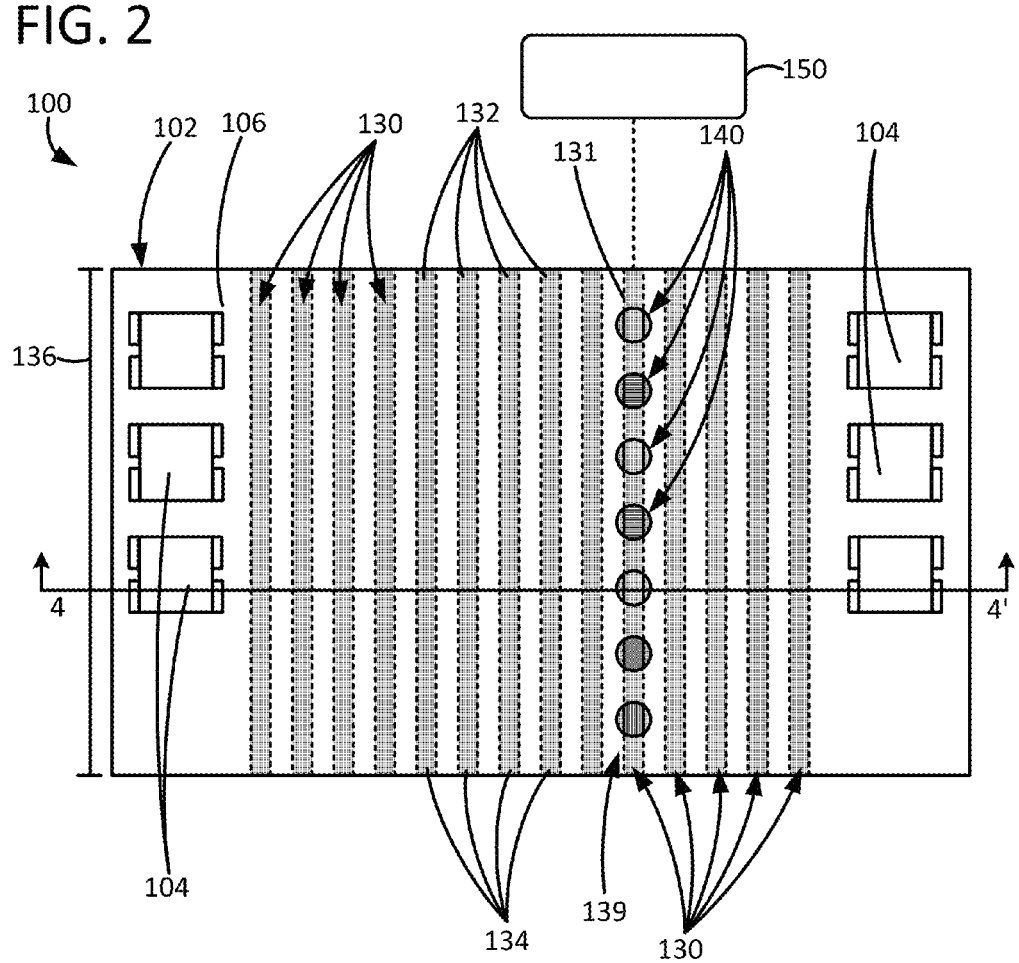
FIG. 2 is top view of an exemplary assembly including printed circuit board, a plurality of optical waveguides, and a plurality of optical vias.

As shown in FIG. 2, the assembly 100 and substrate 102 include a plurality of optical waveguides 130, each of which extend from a first end region 132 to a second end region 134 defining a length 136. The optical waveguides 130 are represented by dotted lines in FIG. 2 since the optical waveguides 130 may not normally be visible through the upper layer 110 (e.g., the upper layer 110 may not be transparent, the upper layer 110 may be at least partially or fully opaque, etc.) in a top view. Although these waveguides 130 are straight, it is to be understood that the exemplary waveguides 130 may define curves or bends and may be used as described herein with the exemplary structures, apparatus, systems, and methods. Further, although a plurality of waveguides 130 are depicted in the exemplary embodiment, it is to be understood that as few as a single waveguide 130 or as many as 1440 waveguides 130 may be located in, or embedded within, the substrate 102 and/or waveguide layer 120. In other words, any number of waveguides 130 may be located within the substrate 102 and/or waveguide layer 120 according to the present disclosure.

The optical waveguides 130 may include various materials including one or more polymers such as, e.g., polyacrylate, polysiloxane, polynorbonene, etc. and/or one or more glasses such as, e.g., chalcogenide glasses, toughed alkali-aluminosilicate sheet glass, etc. The optical waveguides 130 may be described as having a higher index of refraction than the cladding material 122, e.g., so has to provide total internal reflection for effective transmission of light along the optical waveguides 130 from the first end region 132 to the second end region 134. Further, each of the end regions 132, 134 may define optical waveguide facets configured to receive light thereto and transmit light therefrom. The optical waveguide facets may be polished, e.g., to minimize coupling losses.

The exemplar assembly 100 may include, or define, an optical access 139 to one or more optical waveguides 130. In particular, an optical access 139 is provided to a single optical waveguide 131 of the plurality of optical waveguides 130. Generally, an optical access 139 may be configured to allow light such as light such as, e.g., scattered light, from the optical waveguide 131 to be measured, or sampled, using the optical access 139 (e.g., light may be transmitted through the optical access 139).

Figure 3:
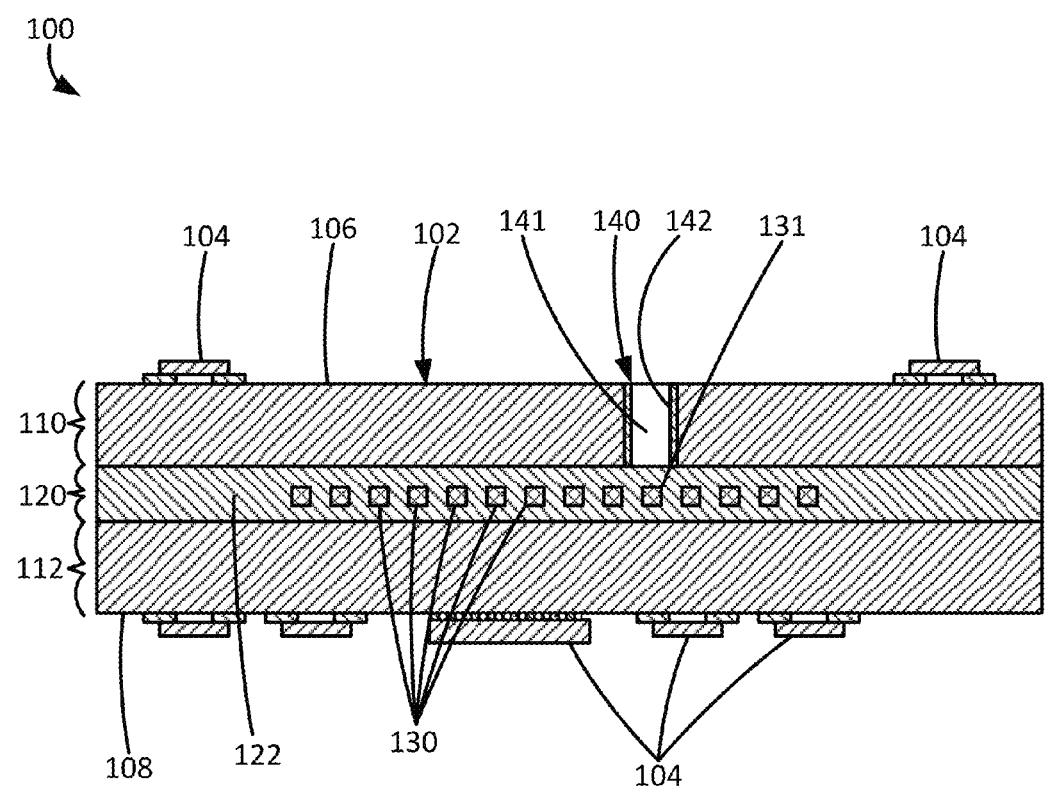
FIG. 3 is a cross-sectional view of the printed circuit board including a plurality of optical waveguides and an optical via taken across line 4-4' of FIG. 2.
Figure 4:
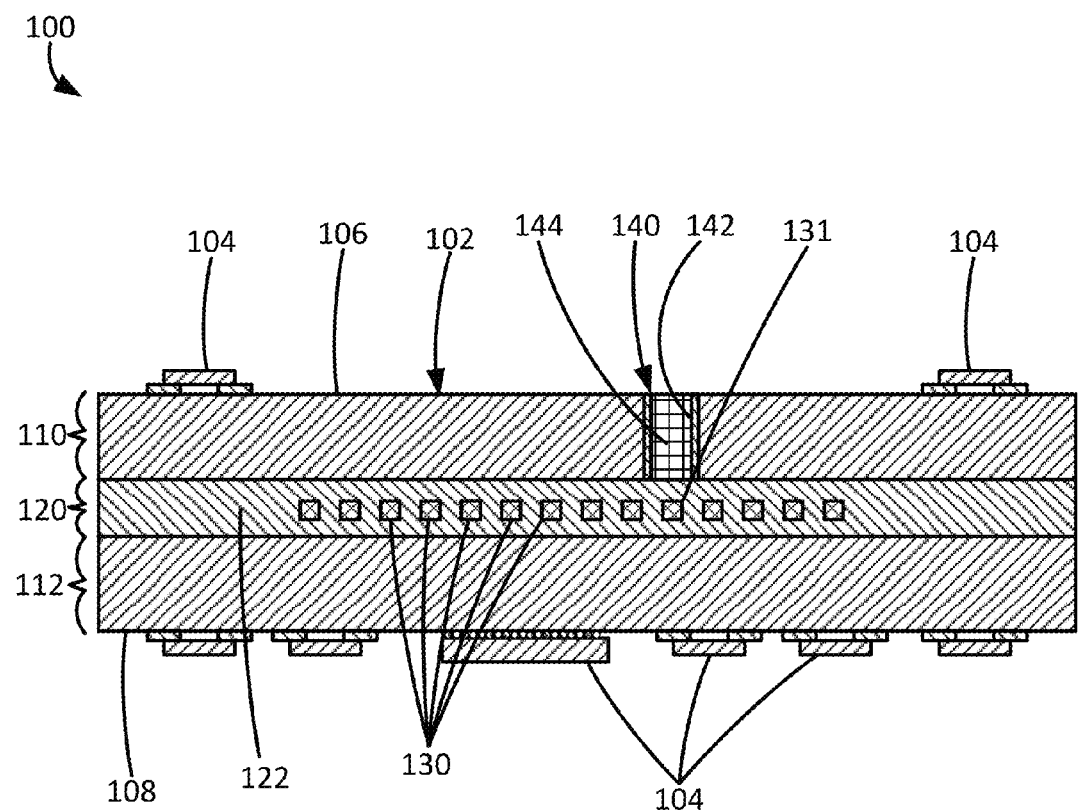
FIG. 4 is the cross-sectional view of the printed circuit board of FIG. 3 including transparent material located in the optical via.

In this embodiment, the optical access 139 is a plurality of optical vias 140 extending through at least a portion of the substrate 102 towards an optical waveguide 130. In other embodiments, the optical access 139 may include various structures and/or apparatus than optical vias 140 such as, e.g., a trench as described herein with respect to FIGS. 10-12D. As shown in FIGS. 2-4, the optical vias 140 may be located, or positioned, along various, or different, locations along the length 136 of the optical waveguide 130. As shown, the optical vias 140 extend towards a single optical waveguide 131 of the plurality of optical waveguides 130 of the assembly 100. A plurality of optical vias 140 that extend to the single optical waveguide 131 may be described as being associated with the single optical waveguide 131 (since, e.g., the plurality of optical vias 140 may be used determine coupling loss of the single optical waveguide 130).

Further, the single optical waveguide 131, i.e., the waveguide 130 that has the optical vias 140 associated therewith, may be described as being a surrogate, or representative of, all of the other optical waveguides 130 (e.g., the end regions 132, 134, or facets, of each of the optical waveguides 130 may be formed, polished, cut, etc. in a similar fashion so as to have similar optical characteristics (e.g., coupling losses, etc.), and thus, the single optical waveguide 131 may have similar optical characteristics as the other waveguides 130). In other embodiments, the assembly 100 may include optical vias 140 extending and associated with more than a single optical waveguide 131 (e.g., two or more optical waveguides 130 may have optical vias 140 extending thereto).

The optical vias 140 may be configured in any configuration or fashion so as to be able to transmit at least some light such as, e.g., scattered light, away from the optical waveguide 131 towards the first surface 106. In the embodiment depicted, the optical vias 140 extend to the cladding material 122 of the waveguide layer 120, and at least some light, or indirect light, may be transmitted from the optical waveguide 131 into the cladding material 122, into the optical via 140, and transmitted towards the first surface 106 through the optical via 140. In other embodiments, at least a portion or all of the cladding material 122 may be removed such that the optical via 140 extends through at least a portion or all of the cladding material 122 to be closer to the optical waveguide 131 than as shown.

As shown in FIG. 3, the optical vias 140 may be formed as a void, or aperture, 141 extending into the first surface 106 of the substrate 102. The side surfaces, or walls, 142 of the optical via 140 may be metallized to, e.g., further transmit light through the optical via 140. The side surfaces 142 may also be described as being adjacent the substrate 102 (e.g., the upper layer 110 of the substrate 102). The metallized side surfaces 142 of the vias 140 may include one or more materials such as, e.g., Copper, Nickel, Silver, Palladium, and/or Gold.

The optical vias 140 may further include light transmitting material 144 as shown in FIG. 4 to transmit light therethrough. The light transmitting material 144 may include one or more materials such as, e.g., polymer, polyacrylate, polysiloxane, polynorbonene, glass, silica, and/or quartz. The light transmitting material 144 may be added to the optical vias 140 after the voids, or apertures, 141 are formed in the upper layer 110 of the substrate 102. It may be described that the vias 140 may be filled with a light transmitting material 144 (e.g., transparent filler material) to prevent contamination of the optical access via. In at least one embodiment, the light transmitting material 144 may be an optical polymer that is deposited in an uncured form over the voids 141, "doctor bladed" or "squeegeed" to create a planar surface of the optical via 140 which is flush with the first, or upper, surface 106 of the substrate, and then optically cured.

The exemplary method 10 may further include directing light into the optical waveguide 131 (block 14). More specifically, light may be directed into the first end region 132 (e.g., optical facet) of the optical waveguide 131. Directing light into the first end region 132 of the optical waveguide 131 may include "overfilling" the waveguide with light to, e.g., to ensure that similar, or the same, proportion of light propagating through the waveguide 131 is located (e.g., scattered) at every point along the length 136 of the waveguide 131. In other words, an "overfilled launch condition" may be used when directing light into the waveguide.

Exemplary light delivery apparatus 150 depicted diagrammatically in FIG. 2 may be configured to direct light into the first end region 132 of the optical waveguide 131. In at least one embodiment, the light delivery apparatus may be an incoherent light source, such as, e.g., an LED coupled to a step-index fibre with a larger core than that of the waveguide 131 with the light in the step-index fibre having been properly scrambled using a mode filter or coiling the fibre around a mandrel (e.g., to create a stable reproducible modal distribution at the launch facet. The output of the step-index fibre may serve as the input to the waveguide 131. Further, a variety of alternative launch conditions including graded index multimode fibres, which have been passed through a modal conditioner, may be used.

While light is being delivered, or directed, into the waveguide 131, the exemplary method 10 may further include measuring the light at a plurality of points along the optical waveguide (block 16). For example, light may be measured at each of the optical vias 140. In one or more embodiments, the light may be measured at each of the optical vias 140 one at time, a plurality at a time, or all at the same time depending. Further, for example, light may be measured at a plurality of points along an optical trench as described herein with respect to FIGS. 12A-12D.

Figure 5:
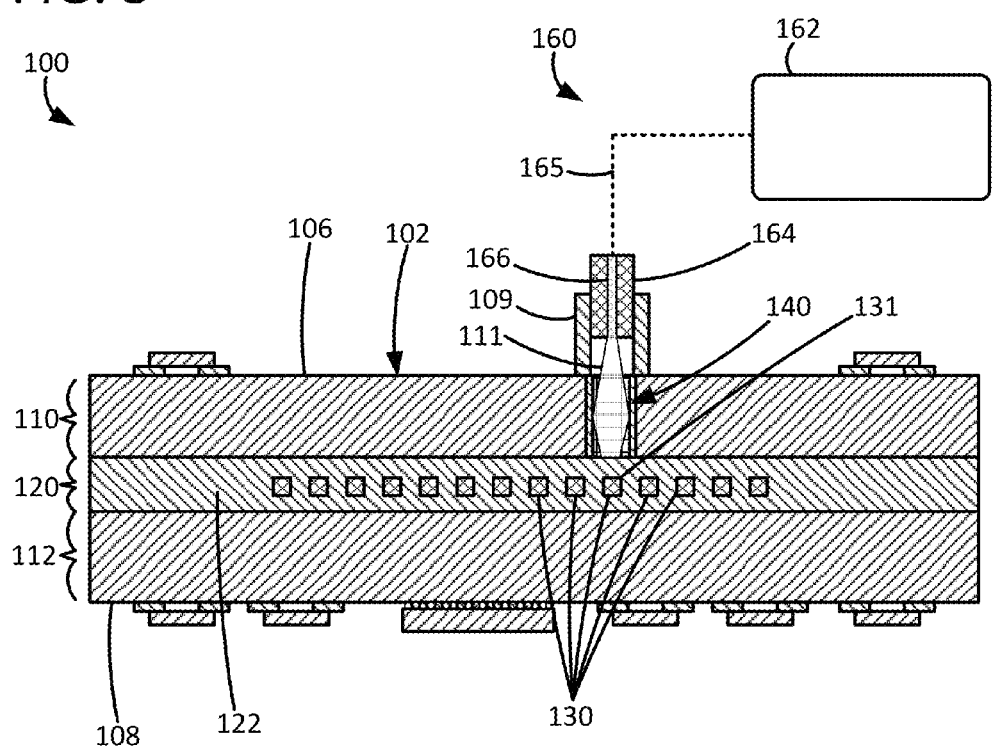
FIG. 5 is the cross-sectional view of the printed circuit board of FIG. 4 with an exemplary light measurement apparatus measuring light from an optical waveguide using the optical via including a receptacle portion.

The light measurement apparatus 160, as shown in FIG. 5, may include any one or more structures or apparatus configured to measure one or more characteristics and/or properties of the light 111 from each of the optical vias 140. For example, the light measurement apparatus 160 may measure the intensity of light, the amount of light, spectral profile of light, modal distribution of light, etc. Further, the one or more characteristics and/or properties of the light 111 may be numerically represented as a value such as, e.g., signal attenuation, that may be used to determine the coupling loss as will be described further herein.

As shown in FIG. 5, the light measurement apparatus 160 includes computing apparatus 162 that is operatively coupled (e.g., indicated by a dotted line) to an optical fibre ferrule 164 including an optical fibre 166. The operative coupling between the computing apparatus 162 and the optical fibre ferrule 164 may include an optical cable 165 configured to transmit light from the optical fibre ferrule 164 to light detection apparatus that is operatively coupled to or part of the computing apparatus 162. The optical fibre ferrule 164 and the optical cable 165 may share the same optical fibre 166.

The computing apparatus 162 may include various circuitry, logic, memory, etc. for use measuring the amount, intensity, spectral profile of light, modal distribution of light, etc. of light from each of the optical vias 140 using one or more other portions, or parts, of the light measurement apparatus 160 and determining coupling loss of the optical waveguide 131 based on the light measurements (e.g., light attenuation values, etc.) as will be described further herein. For example, the computing apparatus 162 may include one or more circuit components such as integrated circuits, processors, etc. that may be configured to interface with the remainder of the light measurement apparatus 160 to position, or locate, the optical fibre ferrule 164 proximate each of the optical vias 140 near the first surface 106, to measure the light from each of the optical vias 140, and further to use the light measurements to determine optical coupling loss of the waveguide 131. To measure the light transmitted received by the optical ferrule 166, the light measurement apparatus 160 and/or the computing apparatus 162 may include one or more sensors, such as, e.g., a photodetector, etc., which will convert the characteristics and/or properties of the light 111 (e.g., amount of light, intensity of light, etc.) into a value (e.g., light attenuation value) usable by the computing apparatus 162 to determine coupling loss of the waveguide 131.

The exemplary assembly 100 of FIG. 5 further includes a ferrule receptacle 109 configured (e.g., sized, shaped, defining an aperture, etc.) to receive the optical fibre ferrule 164. The optical fibre ferrule 164 may be described as mating with the ferrule receptacle 109 to create a seal, or tight-fit, between the optical fibre ferrule 164 and ferrule receptacle 109 to provide, or ensure, optical coupling therebetween such that the optical fibre of the optical fibre ferrule 164 can receive, or capture, light from optical via 140, e.g., without any interference from other light sources. The ferrule receptacle 109 may be positioned, and coupled to, the first surface 106 around the optical via 140. Although a single ferrule receptacle 109 is depicted in the cross section of FIG. 5, it is be understood that the assembly 100 may include a ferrule receptacle 109 for each of the optical vias 140. The ferrule receptacle 109 used in conjunction with the optical fiber ferrule 164 may be described as a "closed" system because, e.g., the optical fibre of the optical fibre ferrule 164 may be protected, or closed-off from, receiving ambient light (e.g., light other than from the optical via 140).

In other words, the assembly 100 may include attachments or receptacles coupled to the first surface 106 of the substrate 102 (e.g., PCB) near the optical vias 140 to allow optical fibre ferrules 164 to be connected in place over the via 140 to capture light, which can then be redirected to a photodetector in a closed system (e.g., blocking out all ambient light). Further, it is to be understood that the light measurement apparatus 160 may include a single optical fibre ferrule 164 to measure light from each of the optical vias 140 one-at-a-time, or multiple optical fibre ferrules 164 configured to measure light from multiple optical vias 140 at the same time or simultaneously.

Figure 6:
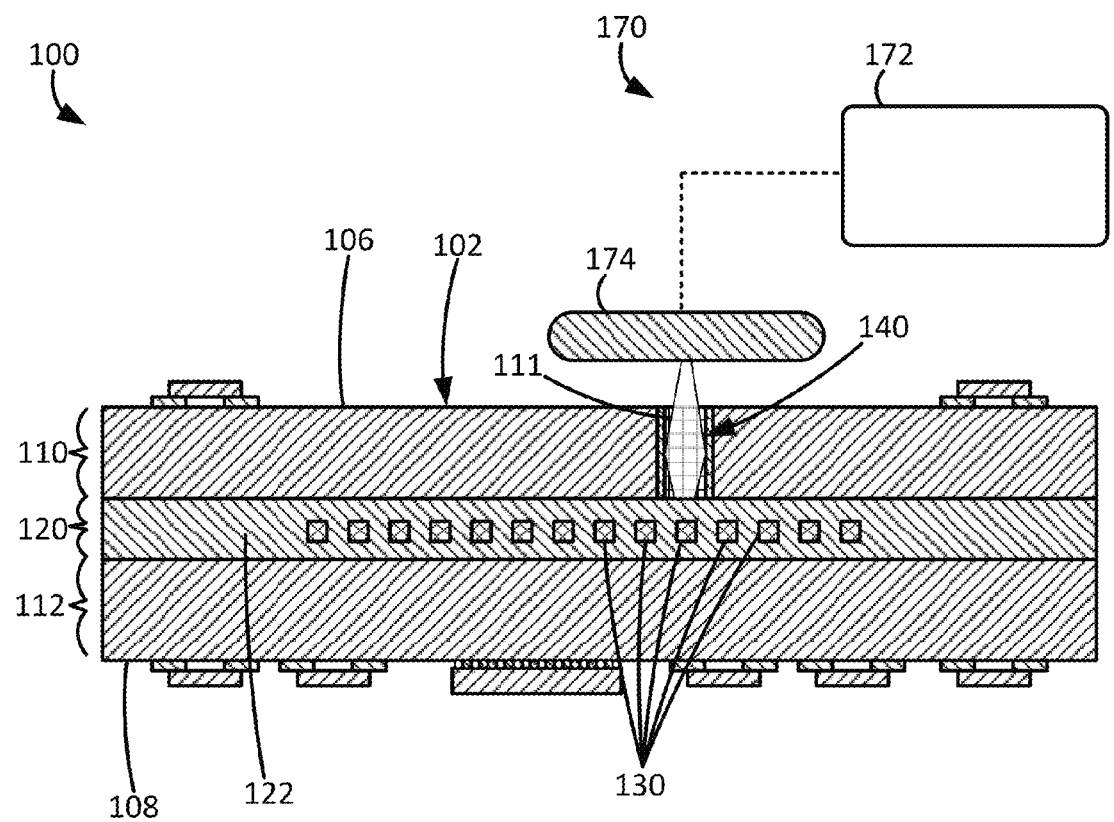
FIG. 6 is the cross-sectional view of the printed circuit board of FIG. 4 with another exemplary light measurement apparatus measuring light from an optical waveguide using the optical via.

Another embodiment of light measurement apparatus 170 is depicted in FIG. 6. Similar to the light measurement apparatus 160 of FIG. 5, the light measurement apparatus 170 may include computing apparatus 172 and may include any one or more structures or apparatus configured to measure one or more characteristics and/or properties of the light 111 (e.g., the intensity of light, the amount of light, spectral profile of light, modal distribution of light, etc.) from each of the optical vias 140. In this embodiment, the light measurement apparatus 170 may include a photodetector sensor 174 positionable above the optical via 140 at least some distance away from the first surface 106 (e.g., which may be suitable for an elongated via to increase amount of light that can be collected, which may be considered will be a tradeoff between the sensitivity off the photo detector and the length of the elongated via). The photodetector sensor 174 may be positioned over each of the optical vias 140 to capture, or receive, light from each of the optical vias 140, and the computing apparatus 172 may be configured to determine coupling loss of the optical waveguide 131 from the light measurements. Further, in at least one embodiment, the photodetector sensor 174 may be described as being "swept" across the line of the optical vias 140 over the first surface 106 to gather, or collect, the light from each of the optical vias 140. This exemplary light measurement apparatus 170 may be described as being an "open" system because the photodetector sensor 174 may also capture, or collect, ambient light and/or light emitted from other optical vias 140 other than from the optical vias 140 that the photodetector sensor 174 is positioned the most proximate thereto (to, e.g., collect the scattered light therefrom).

Figure 7:
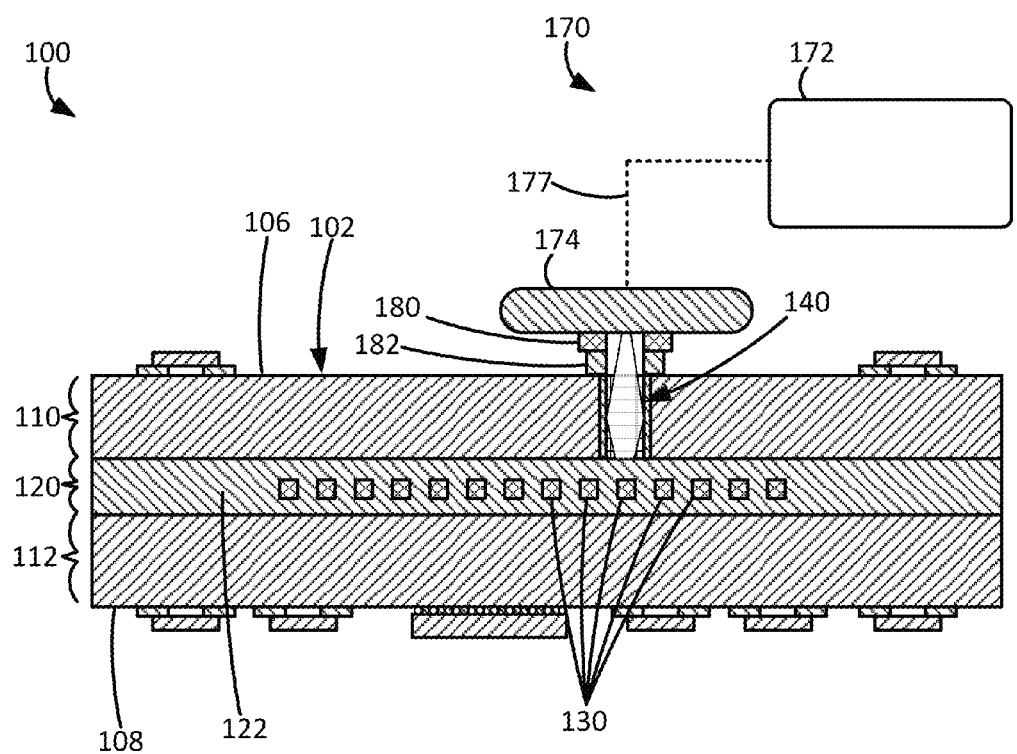
FIG. 7 is the cross-sectional view of the printed circuit board of FIG. 4 with another exemplary light measurement apparatus measuring light from an optical waveguide using the optical via including a receptacle portion.
Figure 8:
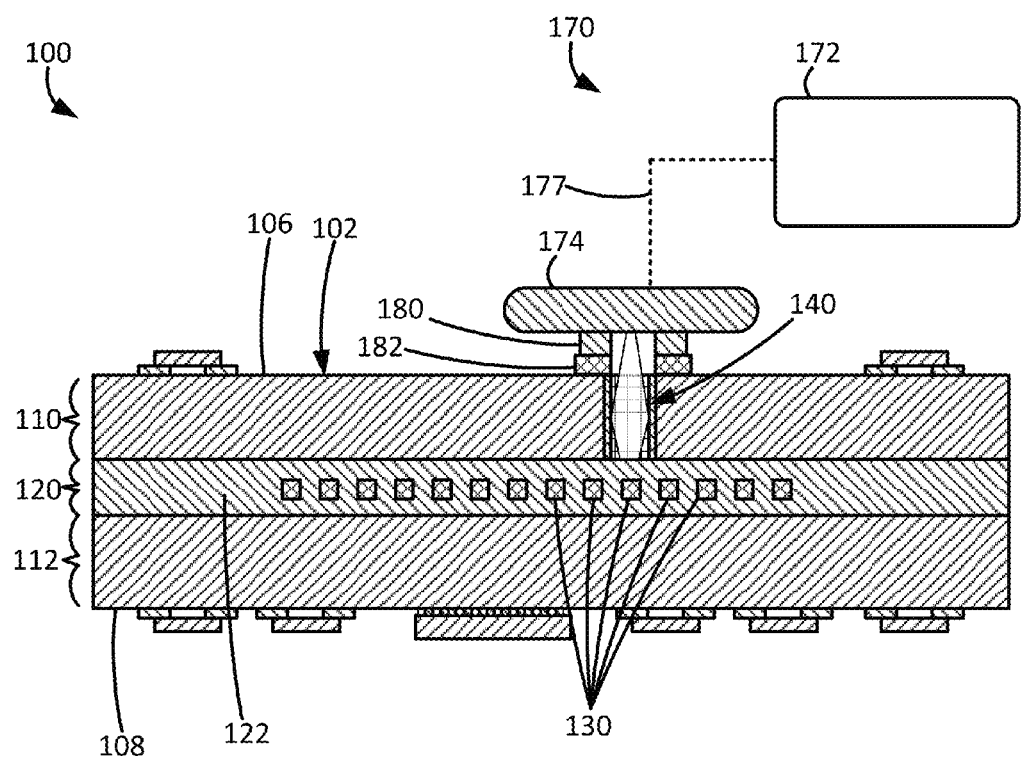
FIG. 8 is a cross-sectional view of the printed circuit board of FIG. 4 with another exemplary light measurement apparatus measuring light from an optical waveguide using the optical via including a compliant receptacle portion.

The light measurement apparatus 170 of FIG. 6 may also be used in "closed" systems as shown in FIGS. 7-8. For example, plug apparatus 180 may be coupled to the photodetector sensor 174 and receptacle apparatus 182 may be coupled to the substrate 102. The plug apparatus 180 and/or the receptacle apparatus 182 may be formed of compliant, or resilient, material (e.g., spongy material, springy material, etc.) so that when the plug apparatus 180 is located, or placed, in contact with the receptacle apparatus 182, or vice versa, the compliancy, or resiliency, of the material or materials may reduce the risk of bumping the substrate 102 and/or photodetector sensor 174 out of alignment with each other. In the embodiment of FIG. 7, the plug apparatus 180 may be compliant while the receptacle apparatus 182 is non-compliant. Conversely, in the embodiment of FIG. 8, the receptacle apparatus 182 may be compliant while the plug apparatus 180 is non-compliant. In other embodiments, both of the plug apparatus 180 and receptacle apparatus 182 may be compliant.

Figure 9A:
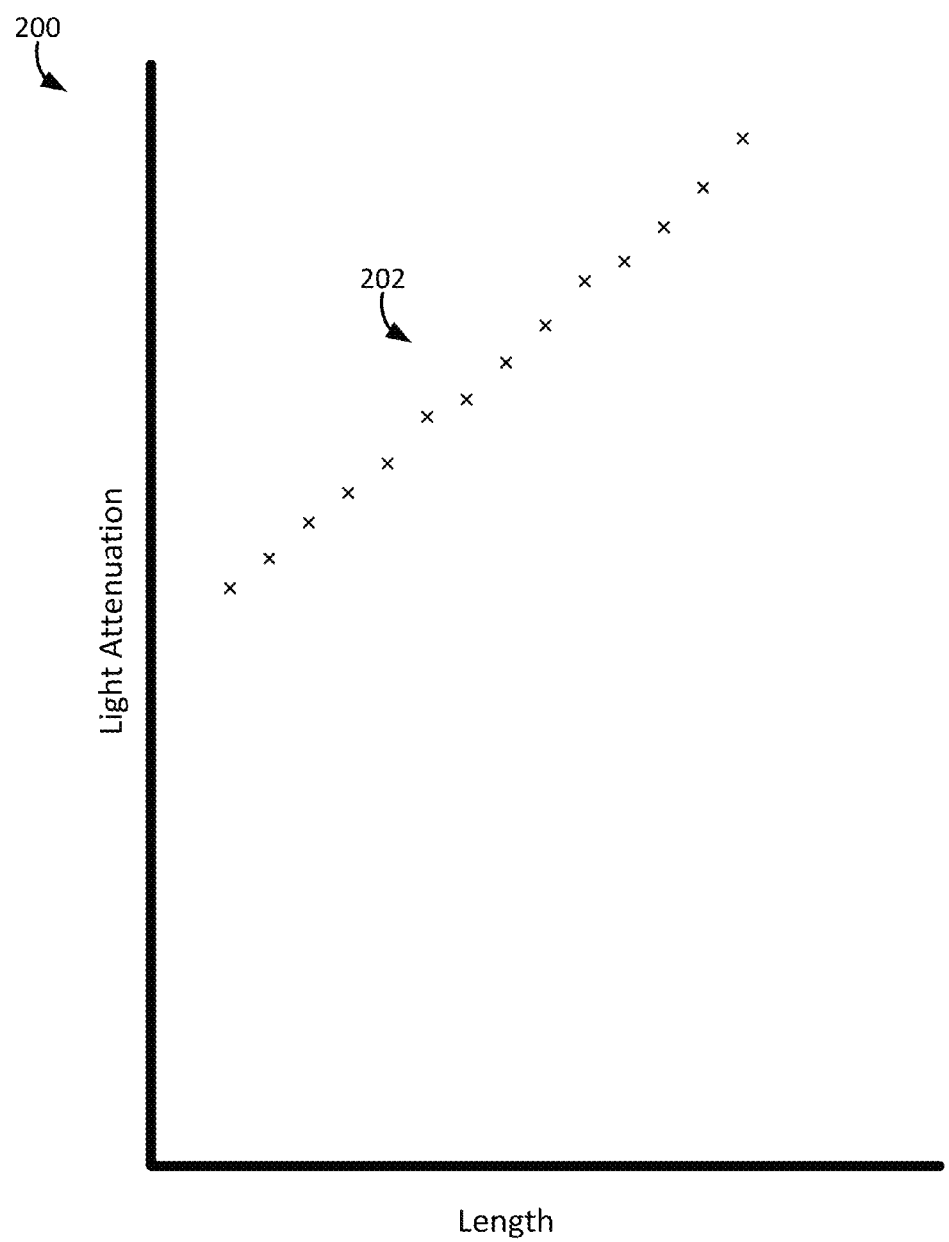

After the light has been measured at each optical via 140 (block 16), the exemplary method 10 may include determining coupling loss of the optical waveguide based at least in part on the measured light (block 18). For example, each of the light measurements may be plotted as light attenuation values 202 on a graph 200 of light attenuation (e.g., reduction of the strength of the signal generated from the photodetector sensor or other lighting sensing apparatus) versus length from the first end region 132 as shown in FIG. 9A. As shown, as length increases (e.g., distance from the first end region 132 of the waveguide 131), the light attenuation values 202 may increase (e.g., the light measurement values may be decreasing, which indicates an increase in attenuation). It is to be understood that the light attenuation is logarithmic, and thus, the y-axis is a logarithmic scale such that the light attenuation values 202 plot linearly as length or distance from the first end region 132 (e.g., where the light source is located) increases. In one or more embodiments, to calculate an attenuation value from the measured power, one may use a comparative power in value as attenuation=$10 \log_{10} (P_{out}/P_{in})$, where $P_{in}$ is the power directed into the waveguide input port (e.g., the first end region 132 of the optical waveguide 131) and $P_{out}$ is the value measured by the light measurement apparatus 160.

Figure 9B:
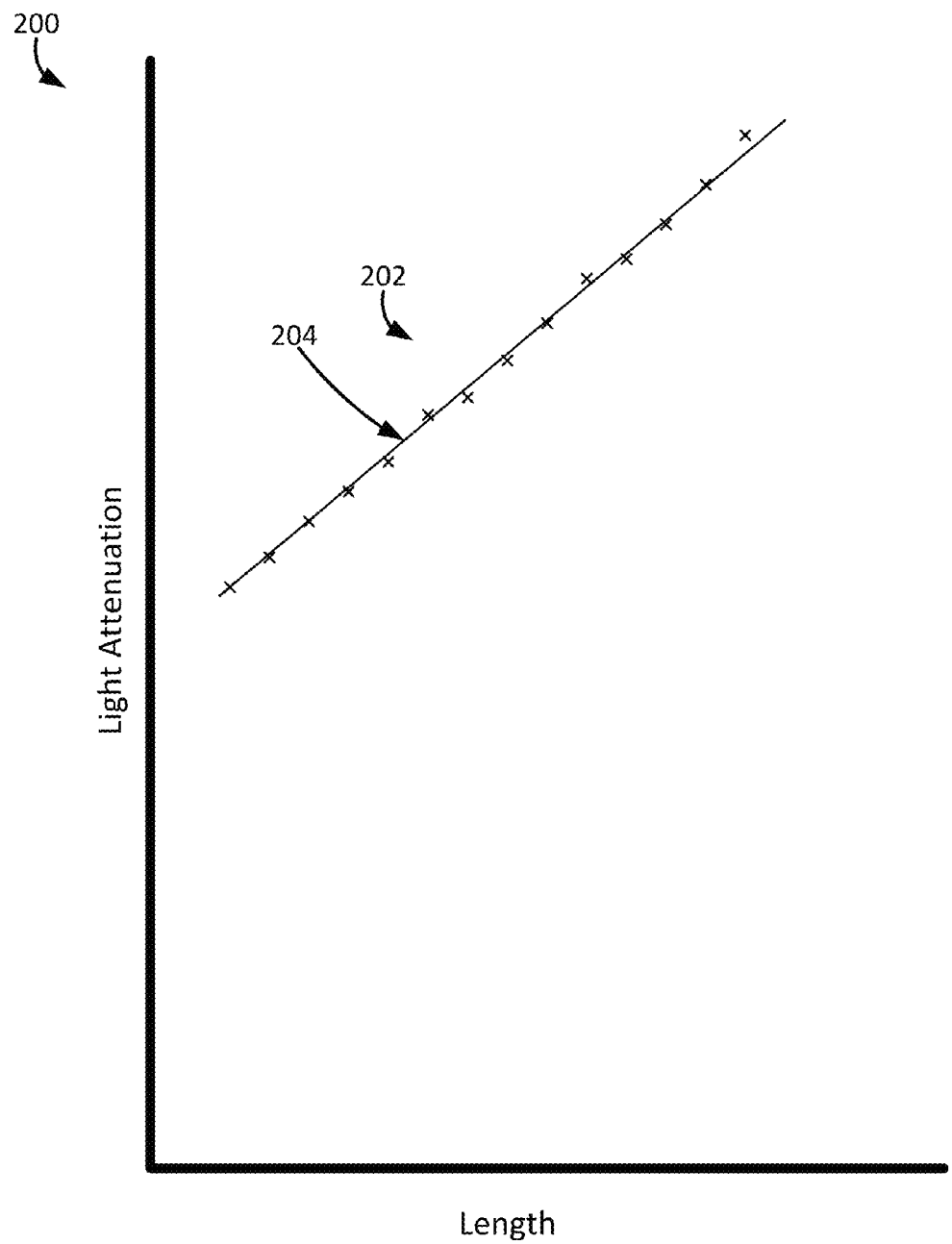

After the light attenuation values 202 are plotted, a light attenuation function 204 may be generated based on the light attenuation values 202 as shown in FIG. 9B. More specifically, a linear light attenuation function, slope, or line, 204 has been generated based on the light values 202. The light attenuation function, slope, or line, 204 of the light attenuation over length may then be used to determine the coupling loss of the optical waveguide 131 as will be described further herein.

Next, the light exiting the second end region 134 of the optical waveguide 131 may be measured using the same light measurement apparatus or another light measurement apparatus used to measure the light (e.g., scattered light) from the optical vias 140. More specifically, the amount, or power, of light exiting, or output, from the second end region (e.g., exit facet) may be measured, and a waveguide exit light attenuation value 206 based on the amount, or power, of light measured may be plotted on the graph 200 based on the amount, or power, of light exiting, or output, from the second end region (e.g., exit facet) measured relative to the amount, or power of light entering the waveguide through the first region 134. As shown in FIG. 9C, the waveguide exit light attenuation value 206 may not be aligned with (e.g., does not correspond with or fit to) the measured light attenuation function 204 because, e.g., the waveguide exit light attenuation value 206 is generated based on the amount of light measured from the second end region 134, or facet of the optical waveguide 131, and thus, may be considered a "direct" measurement as opposed to the light attenuation measurements that are considered to be "indirect" measurements. In one or more embodiments, to calculate a waveguide exit light attenuation value from the measured power, one may use a comparative power in value as attenuation=$10 \log_{10} (P_{out}/P_{in})$, where $P_{in}$ is the power directed into the waveguide input port (e.g., the first end region 132 of the optical waveguide 131) and $P_{out}$ is the power directed from the waveguide exit port (e.g., the second end region 134 of the optical waveguide 131).

The waveguide exit light attenuation value 206 may then be used to calibrate, or shift, the light attenuation function 204 to more closely represent the actual attenuation within the waveguide 131 (e.g., as opposed to the indirect light attenuation measured using the optical vias 140). As shown in FIG. 9D, the light attenuation function 204 is shifted (as represented by dotted arrows) to correspond to the waveguide exit light attenuation value 206.

Further, the shifted light attenuation function 204 may then be extended (as shown with dotted lines) to cross the y-axis at a y-axis crossing 212. The y-axis crossing 212 may represent the optical coupling loss of the waveguide 131. For example, the y-value at the y-axis crossing may be the coupling loss of the optical waveguide. In other words, the y-axis crossing 212 generally shows that if the length of the waveguide were zero, the light attenuation would be the y-value at the y-axis crossing 212. Thus, the optical coupling loss may be determined from y-axis crossing 212.

It is be understood that the exemplary systems, apparatus, structures, and methods may use any one or more processes to determine coupling loss using the light measurements from the plurality of optical vias, and the example depicted in FIGS. 9A-9D may only graphically depict one way to determine optical coupling loss of the waveguide 131. For example, the processes depicted in FIGS. 9A-9D may be performed computationally, or algebraically, without any graphics or line plotting. Further, it is to be understood that the graphical representation depicted in FIGS. 9A-9D may not be depicted in proper scale or may not be properly scaled (e.g., the waveguide exit light attenuation value 206 may be much less than the measured light attenuation values 202 since, for example, the waveguide exit light attenuation value 206 is measured more directly than the measured light attenuation values 202).

After the coupling loss has been determined (block 18), the exemplary method 10 may further provide a notification (e.g., light, sound, etc.) to, e.g., an operator, if the coupling loss is acceptable or unacceptable (block 20). For example, an operator may want to know when an exemplary assembly includes an optical waveguide that has a coupling loss that exceeds an allowable amount. Thus, the exemplary method 10 may use a selected value, such as, e.g., a maximum allowable value, or one or more values such as, e.g., an acceptable range, and may compare the determine coupling loss (block 18) to the selected value or values. If the determined coupling loss value exceeds the maximum allowable value or does not fall within an acceptable range, then the method 10 may provide a notification (block 20) such as a light, sound, and/or any other form of communication to an operator or another electro-mechanical system such that the assembly may be removed from manufacture, refurbished, analyzed, etc.

Conversely, the method 10 may only provide a notification when the assembly includes an optical waveguide that does have an acceptable coupling loss. In this way, an operator or electromechanical system may hold the assembly from further processing or manufacture until the optical waveguide is evaluated and notification is provided that the optical waveguide is acceptable.

In brief, the exemplary method 10 may compare the determined coupling loss to one or more selected values and issue a notification based on the comparison. The notification may indicate that the optical waveguide of the assembly is acceptable and/or unacceptable.

In one or more embodiments, light measurement values measured, or recorded from, the optical vias 140 closest to the first end region 132 of the optical waveguide 131 may be disregarded because, e.g., such optical vias 140 may be close, or too close, to the "equilibrium length" of the optical waveguide 131, which is the distance after which propagating optical energy may distribute itself into a balanced distribution whereby energy exchange between different modes during propagation normalizes. Further, an overfilled launch may reduce this equilibrium length.

Figure 10:
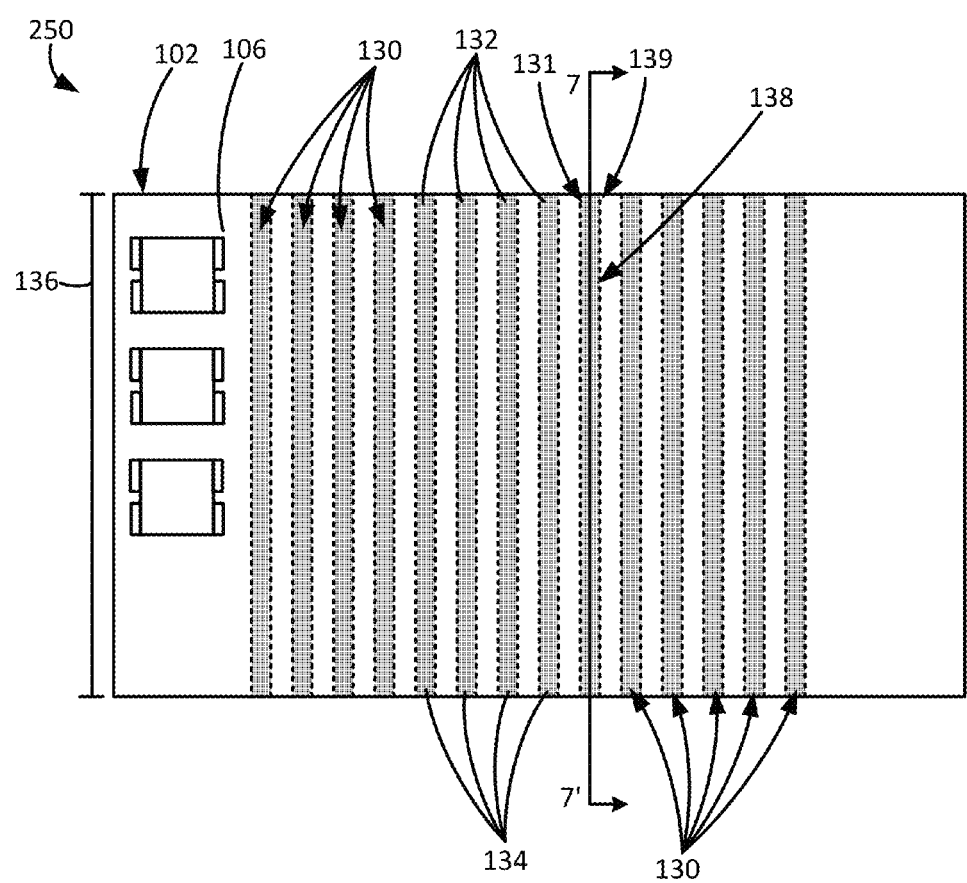
FIG. 10 is top view of an exemplary assembly including printed circuit board, a plurality of optical waveguides, and an optical trench.
Figure 11:
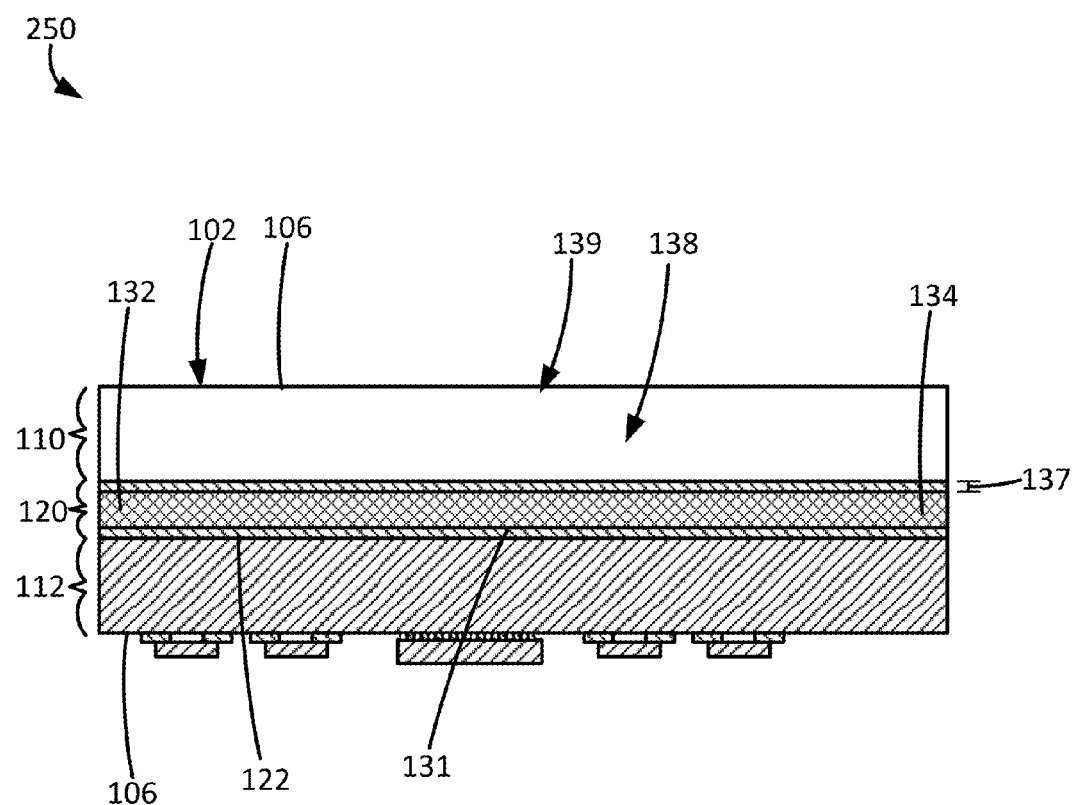
FIG. 11 is a cross-sectional view of the printed circuit board including a plurality of optical waveguides and an optical trench taken across line 7-7' of FIG. 10.

As shown, the assembly 250 of FIGS. 10-12 may be similar to the assembly 100 of FIGS. 2-4. For example, the assembly 250 may include a substrate 102 defining a first, or upper, surface 106 and a second, or lower, surface 108 opposite the first surface 106, a plurality of optical vias 130 extending from a first end region 132 to a second end region 134 defining a length 136 similar to the assembly 100. Further, for example, the assembly 250 may include an upper layer 110, a lower layer 112, and a waveguide layer 120 including cladding material 122 and a plurality of optical waveguides 130 similar to the assembly 100.

As described herein, exemplary optical access 139 may include apparatus and/or structures different from the plurality of optical vias 140. For example, the optical access 139 of the assembly 250 is different from the optical access 139 of the assembly 100. In the assembly 250, the optical access 139 includes, or defines, an optical trench 138 configured to be used to measure, or sample, light from an optical waveguide 131.

The optical trench 138 may extend along a part or the entire optical waveguide 131. More specifically, the optical trench 138 may extend from the first end region 132 to the second end region 134 along the entire length 136 or one or more portions of the length 136 between the first end region 132 and the second region 134. In this example, the optical trench 138 extends along the entire length 136 of the optical waveguide 131.

In this embodiment, the optical trench 138 may not include material or be devoid of material. In other embodiments, the optical trench 138 may include material such as, e.g., transparent material. Although not shown, in some embodiments, the assembly 250 may further include closure portion configured to cover, or seal, the optical trench 138 when not being used to determine coupling loss of the optical waveguide 131.

The optical trench 138 may extend through the first surface 106 into some or all of the first layer 110 towards the waveguide layer 120 and/or into some or all of the cladding material 122 towards the optical waveguide 131. In this embodiment, the optical trench 138 through the first surface 106 through all of the first layer 110 to the cladding material 122. The cladding material 122 between the optical trench 138 and the optical waveguide 131 may define a thickness 137 as labeled in FIG. 11, which may be, e.g., about 20 micrometers or less, about 15 micrometers or less, about 10 micrometers or less, about 5 micrometers or less, about 3 micrometers or less, etc.

Exemplary light measurement apparatus may be used to measure light such as, e.g., scattered light and/or evanescent light from the optical waveguide 131 of the assembly 250 at a plurality of points along the length 136 from the first end region 132 to the second end region 134. Specifically, at least a portion of the light measurement apparatus may be located at least partially within the optical trench 138 such that the light measurement apparatus may measure, or sample, light from the optical waveguide 131 through the cladding material 122 (e.g., the cladding material 122 defining thickness 137). For example, exemplary light measurement apparatus 160, 170 as shown in FIGS. 5-8 may be used to measure, or sample, scattered light along the optical trench 131.

Additional exemplary light measurement apparatus 300 is depicted in FIGS. 12A-12D that may be used to sample evanescent light from the optical waveguide 131 through the optical trench 138. The light measurement apparatus 300 may include a deflectable light sampling apparatus 301 and light measurement devices to measure the light sampled using the light sampling apparatus 301.

Figure 12A:
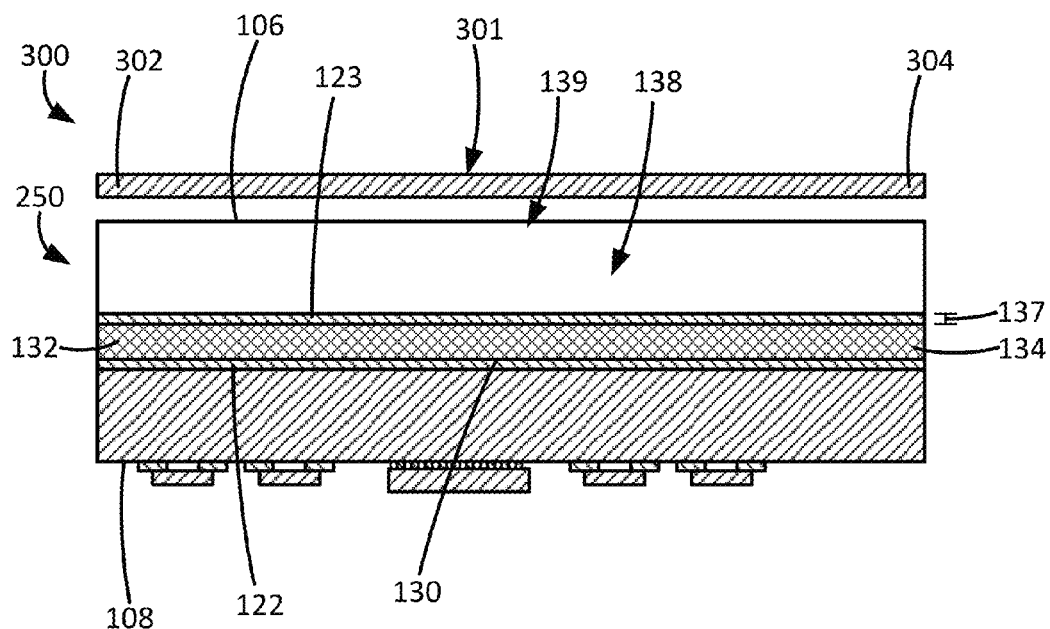
FIGS. 12A-12D are the cross-sectional views of the printed circuit board of FIG. 11 with an exemplary deflectable optical measurement apparatus used to measure light from the optical waveguide.
Figure 12B:
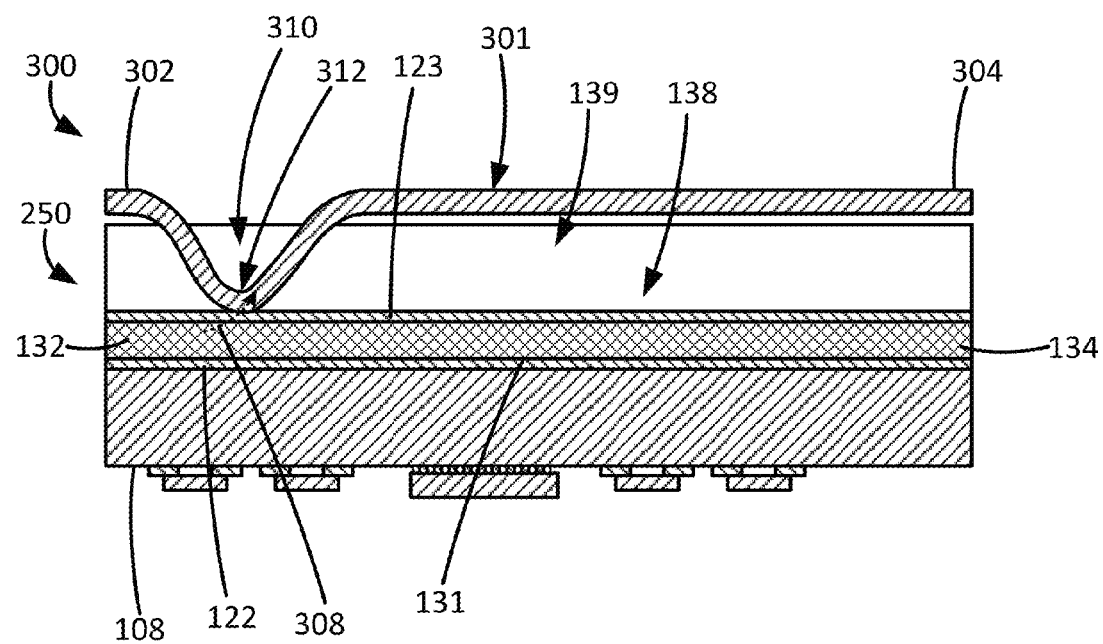
Figure 12C:
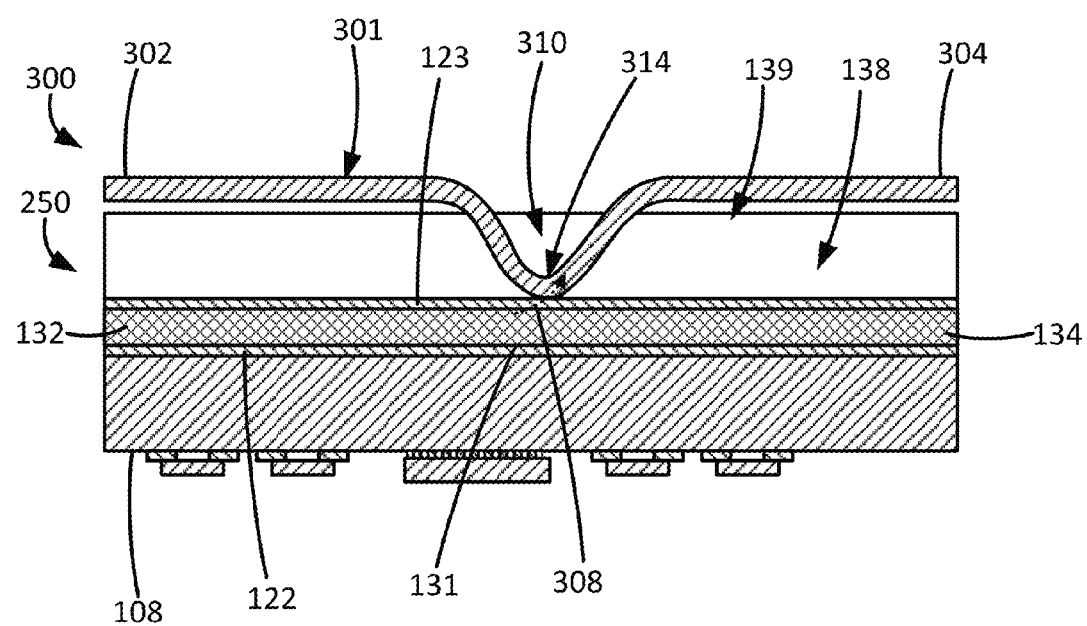
Figure 12D:
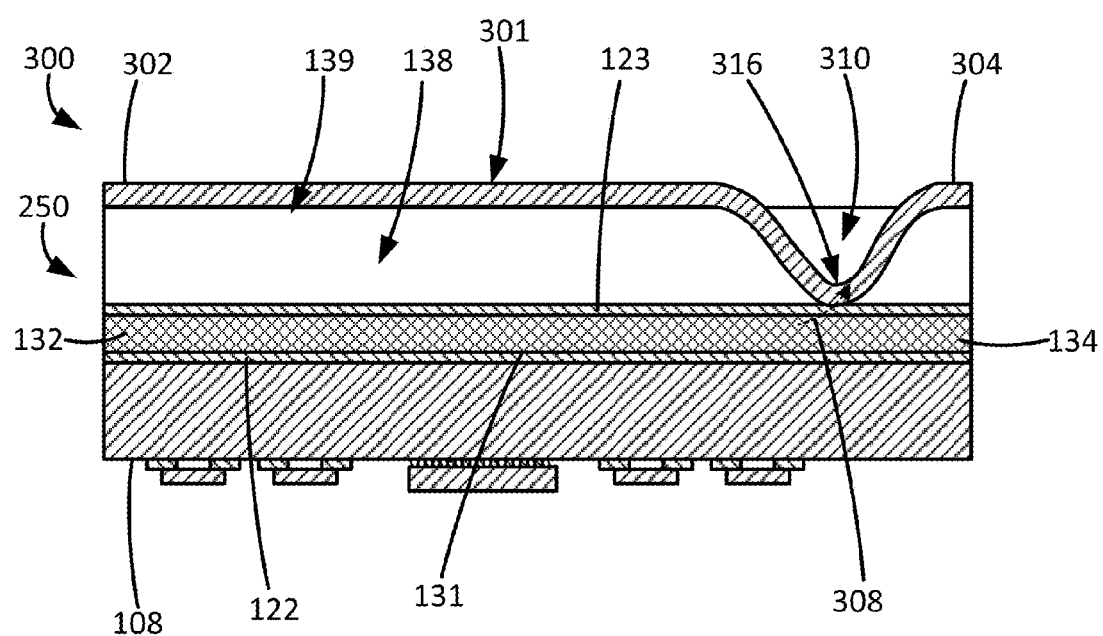

The deflectable light sampling apparatus 301 may be positioned above, or away from, the first surface 106 over the optical trench 138 as shown in FIG. 12A. A portion of the deflectable light sampling apparatus 301 may be deflected into the optical trench 138 (e.g., by a force 310) and into contact, or close proximity to, the cladding material 122 over the optical waveguide 132 as shown in FIGS. 12B-12D. Some light from the optical waveguide 131 may be transmitted through the layer of cladding material 122 into the deflectable light sampling apparatus 301 via evanescent optical coupling as indicated by arrows 308.

The deflectable light sampling apparatus 301 may be described as a flexible optical waveguide extending from a first end region 302 to a second end region 304 and including a core surround by a cladding layer. Different portions of the deflectable light sampling apparatus 301 may be deflected, or moved, towards and in contact with the cladding 122 or close proximity to the optical waveguide 131 to facilitate evanescent optical coupling to collect, or sample, light therefrom.

For example, a first portion 312 of the deflectable light sampling apparatus 301 is deflected into contact with the contact with the cladding material 122 proximate the optical waveguide 131 in FIG. 12B, a second portion 314 of deflectable light sampling apparatus 301 is deflected into contact with the contact with the cladding material 122 proximate the optical waveguide 131 in FIG. 12C, and a third portion 316 of the deflectable light sampling apparatus 301 is deflected into contact with the contact with the cladding material 122 proximate the optical waveguide 131 in FIG. 12D. Further, it is to be understood that the force 310 applied to the portions 312, 314, 316 may be swept along the length of the deflectable light sampling apparatus 301 to move a plurality of portions continuously into contact with the cladding material 122 proximate the optical waveguide 131 to measure, or collect, evanescent light therefrom to determine coupling loss as described herein.

In other words, the optical trench 238 of the exemplary assembly 100 may be described as defining an elongated via, which may allow more light to be gathered. Further, to capturing the light at different points in the waveguide in a more efficient manner, the exemplary systems, apparatus, methods, and structures may use a deflectable light sampling apparatus 301 such as a flexible optical waveguide, or "evanescent coupler." The reference waveguide 131 may be exposed with a shallow upper cladding 123 of the cladding material 122 of about 5 micrometers, and, deflectable light sampling apparatus 301 can be bent in different locations to touch the upper cladding 123 of the optical waveguide 131 in different locations. The upper cladding 123 may be thin enough to allow evanescent coupling of an amount of light from the optical waveguide 131 to deflectable light sampling apparatus 301 ("evanescent coupling apparatus"), which then passes the light to the measurement apparatus. Evanescent coupling may allow a much larger proportion of the light propagating in the waveguide to be extracted and sampled compared to scattered light. Further, in this approach, any contact is temporary so each measurement made in a different location is "pure" in that light will only be extracted from the optical waveguide 131 during contact of the deflectable light sampling apparatus 301 with the upper cladding layer 123. When the contact between the deflectable light sampling apparatus 301 and the upper cladding layer 123 is discontinued or stopped, the light will propagate fully along the waveguide 131 allowing measurements at other points.

Further, in one or more embodiments, there can be a hinged cover over the optical trench 138 to protect it from dust contamination over time, which can be opened when the waveguide 131 is to be measured. Still further, in one or more embodiments, the optical trench 138 may define one or more measurement markers.

The exemplary methods, apparatus, structures, and systems may use optical access ports along integrated waveguides embedded in electro-optical printed circuit boards (PCB). During waveguide propagation, a percentage of the propagating light may be scattered omni-directionally from the core. The light scattered can be measured at defined (e.g., selected, uniform, etc.) distances, or lengths, from the waveguide input port or first end region. For example, the light may be measured over the top of the waveguide, through the top or short cladding layer. Unlike the cut-back method, the light measured may not be described as giving a direct measurement of insertion loss as the light from the optical channel output is not measured directly for each distance. Instead, many samples of the scattered light at different distances from the waveguide input are measured and plotted. Assuming that the same proportion of light propagating through the waveguide is scattered at every point along the length of the waveguide, the samples of scattered light may provide an accurate reading of the rate at which propagating light power attenuates over the length of the waveguide. Such readings can be converted to indirect insertion loss readings based on the launch power. The rate of attenuation may further provide a more accurate value for the slope of the insertion loss change per length of waveguide due to the increase in measurement points. Further, while the cut-back method may typically yield only three measurement points, the exemplary systems, structures, apparatus, and methods may yield dozens of measurement points, which may provide more accurate evaluation than the "cut-back" method. Still further, the insertion loss per length slope can then be combined with a direct measurement of insertion loss of the waveguide (based on the power measured directly at the output channel) whereby the slope is retrospectively adjusted to intersect with the direct insertion loss. So, the slope gradient may be the same, but the offset will be adjusted to match the true measure of direct insertion loss. The intercept of this adjusted slope with the y-axis may give, or provide an accurate estimate of the critical coupling loss from the input and output waveguide facets.

Furthermore, the exemplary systems, structures, apparatus, and methods may be described as providing evaluation, or test, structures in the form of access vias, which may allow accurate measurements of the scattered and/or evanescent light from embedded optical waveguide layers from designated measurement points along a given evaluation, or test, waveguide or group of test waveguides. In one or more embodiments, these access vias may be described as "blind" vias providing a transparent path between the top of the embedded waveguide layer and the top surface of the PCB. In one or more embodiments, these access vias may include a compliant spongey receptacle around them allowing an optical power detector sensor to be pressed over them without mechanically disrupting the sample (which may be sensitive to displacement) while allowing optically closed measurements (e.g., completely blocking out ambient light contamination).

In one or more embodiments, during optical printed circuit board (OPCB) fabrication, an evaluation group including an array of 12 or 16 waveguides may be fabricated. A given OPCB fabricator may have an evaluation board design, which comprises only waveguide evaluation groups, so that variation in coupling loss with distance from the card edges can also be extrapolated. Then, the scattered and/or evanescent light at defined measurement points may be measured using, for example, a large area photo-detector with a spatial filter attached. The spatial filter could, for example, be a pin hole, not much larger than the waveguide core width or a slit.

Further, as opposed to an evaluation board, a normal functional board may also include such evaluation groups, e.g., if there is space on the board. Typically, such evaluation groups may be fabricated on the tokens, which are edge sections of the board, used during fabrication, but are not part of the functional design, and thus, can be removed prior to functional integration. In any case, the method of end facet preparation employed by the fabricator, be it polishing, routing may have a unique signature depending on the facility, location, personnel etc., and this sensitivity may be especially true of multimode waveguides.

The methods, techniques, and/or processes described in this disclosure, including those attributed to the processor, or various constituent components, may be implemented, at least in part, in hardware, software, firmware, or any combination thereof. For example, various aspects of the techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processing apparatus," "processor," or "processing circuitry" may generally refer to any of the foregoing logic circuitry, alone or in combination with other logic circuitry, or any other equivalent circuitry.

Such hardware, software, and/or firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

When implemented in software, the functionality ascribed to the systems, devices and techniques described in this disclosure may be embodied as instructions on a computerreadable medium such as RAM, ROM, NVRAM, EEPROM, FLASH memory, STRAM, RRAM, magnetic data storage media, optical data storage media, or the like. The instructions may be executed by one or more processors to support one or more aspects of the functionality described in this disclosure.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above", "below", etc. may be used in this disclosure. These terms should not be construed as limiting the position or orientation of a structure, but should be used as providing spatial relationship between the structures.

Embodiments of the systems, apparatus, structures, and methods for measuring coupling loss in optical waveguides are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed:

1. A method comprising:
   providing an assembly comprising:
   a substrate defining a first surface and a second surface opposite the first surface,
   an optical waveguide located between the first and second surfaces and extending from a first end region to a second end region, the first end region defining a first facet of the optical waveguide and the second end region defining a second facet of the optical waveguide, and
   an optical access positioned along at least a portion of the optical waveguide and extending through at least a portion of the substrate from the first surface towards the optical waveguide to transmit light from the optical waveguide;
   directing light into the first end region of the optical waveguide;
   measuring light from the optical waveguide using the optical access along a plurality of different points along the optical waveguide, the plurality of different points along the optical waveguide where the light is measured from the optical waveguide using the optical access between the first facet and the second facet;
   determining coupling loss of the optical waveguide based on the measured light;
   measuring light from the second facet of the optical waveguide; and
   adjusting the determined coupling loss based on the measured light from the second facet of the optical waveguide.

2. The method of claim 1, further comprising:
   comparing the determined coupling loss to a selected value; and
   determining that the optical waveguide of the assembly is acceptable if the coupling loss is less than or equal to the selected value.

3. The method of claim 1, wherein the optical access defines a trench extending through at least a portion of the substrate from the first surface towards the optical waveguide.

4. The method of claim 1, wherein measuring light using the optical access comprises:
   positioning light measurement apparatus at a plurality of different points along the optical access; and
   measuring light at each of the plurality of different points using the light measurement apparatus.

5. The method of claim 4, wherein the light measurement apparatus comprises a deflectable light sampling apparatus, wherein positioning light measurement apparatus at a plurality of different points along the optical access comprises deflecting different portions of the deflectable light sampling apparatus into contact with the substrate proximate the optical waveguide within the optical access to evanescently optically couple the deflectable light sampling apparatus to the optical waveguide.

6. The method of claim 1, wherein the optical access defines a plurality of optical vias extending through at least a portion of the substrate from the first surface towards the optical waveguide to transmit scattered light from the optical waveguide, wherein each optical via is located at a different location along the optical waveguide.

7. The method of claim 6, wherein the assembly further comprises a plurality of receptacles coupled to the first surface of the substrate to allow scattered light from the optical waveguide to be measured using each of the plurality of optical vias, each receptacle corresponding to a different optical via of the plurality of optical vias.

8. The method of claim 1, wherein the assembly comprises a cladding layer embedded within the substrate between the first surface and second surface, wherein the optical waveguide is located in the cladding layer, wherein the optical access extends through at least a portion of the substrate from the first surface to the cladding layer to collect light from the optical waveguide.

9. The method of claim 1, wherein directing light into the first end region of the optical waveguide comprises overfilling the optical waveguide with light.

10. The method of claim 1, wherein the optical access comprises light transmitting material to transmit light from the optical waveguide.

11. A system comprising:
a light measurement apparatus to measure light from an optical waveguide located within an assembly, the assembly comprising:
a substrate defining a first surface and a second surface opposite the first surface,
the optical waveguide located between the first surface and second surface and extending from a first end region to a second end region, the first end region defining a first facet of the optical waveguide and the second end region defining a second facet of the optical waveguide, and
an optical access positioned along at least a portion of the optical waveguide and extending through at least a portion of the substrate from the first surface towards the optical waveguide to transmit light from the optical waveguide; and
a computing apparatus operably coupled to the light measurement apparatus and configured to:
measure light from the optical waveguide using the optical access along a plurality of different points along the optical waveguide, the plurality of different points along the optical waveguide where the light is measured from the optical waveguide using the optical access are between the first facet and the second facet,
determine coupling loss of the optical waveguide based on the measured light,
measure light from the second facet of the optical waveguide using the light measurement apparatus, and
adjust the determined coupling loss based on the measured light from the second facet of the optical waveguide.

12. The system of claim 11, further comprising a light delivery apparatus to deliver light into the first end region of the optical waveguide, wherein the computing apparatus is further configured to deliver light into the first end region of the optical waveguide using the light delivery apparatus.

13. The system of claim 12, wherein the light delivery apparatus is configured to overfill the waveguide with light.

14. The system of claim 11, wherein the light measurement apparatus comprises a deflectable light sampling apparatus configured to be evanescently optically coupled to the optical waveguide.

15. A method comprising:
providing an assembly comprising:
a substrate defining a first surface and a second surface opposite the first surface,
an optical waveguide located between the first and second surfaces and extending from a first end region to a second end region, and
an optical access positioned along at least a portion of the optical waveguide and extending through at least a portion of the substrate from the first surface towards the optical waveguide to transmit light from the optical waveguide;
directing light into the first end region of the optical waveguide;
measuring light from the optical waveguide using the optical access along a plurality of different points along the optical waveguide, wherein measuring light using the optical access comprises:
positioning light measurement apparatus at a plurality of different points along the optical access, the light measurement apparatus comprising a deflectable light sampling apparatus, wherein positioning light measurement apparatus at a plurality of different points along the optical access comprises deflecting different portions of the deflectable light sampling apparatus into contact with the substrate proximate the optical waveguide within the optical access to evanescently optically couple the deflectable light sampling apparatus to the optical waveguide; and
measuring light at each of the plurality of different points using the light measurement apparatus; and
determining coupling loss of the optical waveguide based on the measured light.

16. The method of claim 15, further comprising:
comparing the determined coupling loss to a selected value; and
determining that the optical waveguide of the assembly is acceptable if the coupling loss is less than or equal to the selected value.

17. The method of claim 15, wherein the optical access defines a trench extending through at least a portion of the substrate from the first surface towards the optical waveguide.

18. The method of claim 15, wherein the assembly comprises a cladding layer embedded within the substrate between the first surface and second surface, wherein the optical waveguide is located in the cladding layer, wherein the optical access extends through at least a portion of the substrate from the first surface to the cladding layer to collect light from the optical waveguide.

19. The method of claim 15, wherein directing light into the first end region of the optical waveguide comprises overfilling the optical waveguide with light.

20. The method of claim 15, wherein the optical access comprises light transmitting material to transmit light from the optical waveguide.

* * * * *